United States Patent [19]

Brockman

[11] Patent Number: 4,956,864
[45] Date of Patent: Sep. 11, 1990

[54] RECEIVER FOR COMMUNICATIONS SATELLITE DOWN-LINK RECEPTION

[76] Inventor: Milton H. Brockman, 825 Daphne Ct., Carlsbad, Calif. 92009

[21] Appl. No.: 74,954

[22] Filed: Jul. 17, 1987

Related U.S. Application Data

[63] Continuation-in-part of Ser. No. 6,900, Jan. 27, 1987, abandoned, which is a continuation-in-part of Ser. No. 783,697, Oct. 3, 1985, abandoned.

[51] Int. Cl.$^5$ .......................... H04B 7/02; H04B 1/10
[52] U.S. Cl. .......................................... 380/34; 380/9; 380/10; 375/97; 375/98; 455/136; 455/316
[58] Field of Search .................. 380/33, 34, 6, 7, 9, 380/10; 375/1, 97–100; 342/352, 378, 380, 381–384; 455/12, 132, 136–139, 146, 147, 208, 209, 266, 316; 329/112, 122; 331/2, 46, 55, 56

[56] References Cited

U.S. PATENT DOCUMENTS

| | | | |
|---|---|---|---|
| 3,383,599 | 5/1968 | Miyagi | 455/137 |
| 3,593,147 | 7/1971 | Gurak et al. | 455/139 |
| 3,609,663 | 9/1971 | Bickford et al. | 455/138 X |
| 3,728,633 | 4/1973 | Krebs | 455/138 |
| 3,743,941 | 7/1973 | Gans et al. | 455/137 |
| 4,186,347 | 1/1980 | Brockman et al. | 455/136 X |
| 4,210,871 | 7/1980 | Hill et al. | 455/137 |
| 4,334,316 | 6/1982 | Tanaka | 455/139 |

Primary Examiner—Stephen C. Buczinski
Assistant Examiner—Bernarr Earl Gregory
Attorney, Agent, or Firm—James T. English

[57] ABSTRACT

A receiver utilizing a plurality of small paraboloid antennas in lieu of a single large antenna of equal area, each antenna connected to a separate phase coherent heterodyne receiver channel includes a main channel and branch channels, the channels being summed to provide a carrier phase locked loop local oscillator signal that is distributed to all channels producing phase coherent IF signals in all the channels. These are summed to enhance the carrier margin or dB from the sensitivity threshold, of the system combining the receiver channels, to a level greater than that of the single antenna of equivalent area with its single receiver. The tendency toward cycle slipping near threshold is further reduced by providing summed additional amplified uncorrelated predetection receiver noise in the IFs of the branch receiver coupled to the main receiver. The modulation spectra of the receiver channels are demodulated and summed to provide an output signal-to-noise ratio related to the sum of the effective areas of the plurality of smaller antennas. A digital phase locked loop bandwidth controller adjusts the sensitivity of the combined channel system to the received signal level, increasing the dynamic range of the system. The separate channel architecture of the receiver enables secure communications techniques including frequency diversity encoding, polarization diversity encoding, frequency reuse and data stream segment interleaving and multiplexing.

18 Claims, 6 Drawing Sheets

RECEIVER FOR COMMUNICATIONS SATELLITE DOWN-LINK RECEPTION

REFERENCES TO PRIOR APPLICATION

This application is a continuation-in-part of an earlier CIP application, Ser. No. 6,900 filed 01/27/87, now abandoned, which is a CIP of an application, Ser. No. 783,697 filed 10/03/85, now abandoned.

DESCRIPTION

1. Origin of the Invention

This invention was made with Government support under NAS7-918 awarded by NASA. The Government has certain rights in the invention.

2. Background of the Invention

The commercial communications industry is planning a wide expansion of its facilities and it is possible that the number of satellites will increase from about 25 at this time to more than 110 at the turn of the century, if the present plans for increasing user services are implemented. Broadcasters and voice common carriers have been the dominant users of commercial communications satellites in the past. The extensive use of cable television would likely not have taken place if satellite transponders had not provided economical means to get the programming to local cable companies. Commercial television programming is relayed through the C-band transponders of the Hughes Galaxy I, the RCA Satcom 3-R, the Western Union Westar-5 and several other satellites. The transmission of audio broadcast signals is another area in which satellites are utilized. By using single channel per carrier techniques a single satellite transponder has the capability of relaying dozens of independent audio sources. With 10 dBW carriers leased from satellite common carriers, networks with nationwide coverage have been established that provide news and special programming of events through local radio stations. Regional broadcasters are also planning that by leasing a 10 dBW carrier, they can bypass local terrestrial station-to-transmitter links. Up-link antennas 5 meters in diameter and down-link antennas as small as 3 meters (9.85 ft.) are used. Satellite technology has also opened up the door to private networks, economical facility-to-facility data communications, Telex, Facsimilie, and Video Conferencing services. Satellite communications is providing more and more relief to long-haul communications circuits; i.e., coaxial cable. Uplinking is possible from any location with relatively little power.

The critical element in a satellite link is the transponder power needed to perform these communicatIons modes In all weather and under all conditions of loading. In lieu of research and development of better transponders, different methods of increasing the efficiency of a channel are being investigated. Video Conferencing, for example, implementing data compression techniques to trade off minimal picture degradation for greatly reduced data rates, is contemplated. An alternative to video compression is limited motion and freeze frame video. The use of statistical multiplexing and digital speech interpolation techniques can more than double a transponder's voice handling capacity. In addition, a variety of techniques for compressing the basic voice digitization down to 32 kilobits per second, or lower, are under consideration. Companded SSB can significantly increase the capacity of transponders already in orbit. Placing a compander in each voice circuit allows for a satellite transponder power per channel lower than for uncompanded FM. Typically an FM based system with 36 MHz of bandwidth can handle 2,800 one-way voice channels; companded SSB can boost the transponder's capability to 7,200 voice channels.

For the immediate future, however, the most noteworthy aspect of satellite technology is that it is moving to bring direct broadcast service (DBS) to the individual household. Direct broadcasting service in the U.S., downlinked on the 12.2 to 12.6 GHz $K_u$ band is primarily aimed at millions of households that the cable industry does not currently serve. Over the last several years, however, the DBS concept has evolved into much more than a distribution system. What is envisioned now is enhanced quality video, menu driven and password protected program selection, and home data services.

To make the DBS installations feasible, certain technological barriers have to be overcome to make the services desirable and economical for the consumer. One challenge is raising the transponder power to lower the size and cost of Earth station dish antennas that the consumer must invest in. Up until now, some home owners have opted for the reception of satellite C-band TV signals that are intended for local cable distribution. Installing a TV receive-only C-band Earth station is costly, but after one is installed there is a wide variety of programming available. However, court decisions may make it illegal to "pirate" these programs and programmers are undertaking to scramble more and more of their satellite transmissions. A receiver for this service must have the ability to unscramble the various scrambling or encoding algorithms and methods used in future systems.

The $K_u$ band offers the prospect of an integrated home entertainment and information system that surpasses the performance of terrestrial and cable technologies combined. At a fixed carrier level, the signal-to-noise ratio achievable at the DBS delivery point depends on a suitable antenna and a low-noise temperature down converter as well as on the antenna's polarization, pointing error, and gain. However, antenna gain is directly related to the dish size. Hence, to keep the dish small for ease of installation and for concealment, which is becoming a requirement in an increasing number of localities, the need for placing new higher power transponders in orbit becomes imperative unless some alternative system, such as the invention described herein, is used to receive the downlink. In the invention, the dish antennas do not have to be mounted on the roof; they can be small enough to be concealed under the roof in an average dwelling or office building, reducing or eliminating moisture and weather effects which can cause attenuation at $K_u$ band.

The novel receiver employs a combination of principles governing the reception of weak signals and the combining of outputs of antennas and receiver arrays, as well as signal processing for digital and analog signals. The prior art is represented by applicant's prior patent No. U.S. Pat. No. 4,186,347 which is related to telemetry receiver carrier combining of a plurality of separate receiving systems, but which is limited to carrier sensitivity improvement of the array that is less than the ratio of total antenna array aperture to main receiver antenna aperture. The present invention defines receiver implementations for equal or unequal aperture antennas, in combination with other novel features described herein, to obtain carrier sensitivity improvement that is greater than the ratio of total antenna array aperture to main receiver aperture, and provides a correlated demodulated output signal that represents the total antenna array aperture. The unequal aperture case in which antennas of unequal size may be used, is described with reference to performance characteristics of the same system, but it is another embodiment.

SUMMARY OF THE INVENTION

This invention provides a high sensitivity receiver for electromagnetic radiation reception particularly in the C-band, S-band, X-band and $K_u$band which are the bands now in use or planned to be utilized for transmission of commercial communications services and home entertainment and data services. The novel receiver lends itself to reception of several different modes of transmission and program encryption or scrambling, and is amenable to tracking any signal having a lower power level inserted carrier, or a pilot signal such as is used in FM or single sideband. Any type of modulation on the signal or signals that is in turn phase modulated onto a phase stable microwave or RF carrier with a residual carrier whose level is a few percent of the total signal power, can be received and provided to the user for demodulation and detection or presentation. This mode of transmission allows the use of the most sensitive receiving system; i.e., the phase coherent system espoused in this invention. Note that the lower power level inserted carrier or pilot signal cases will provide a less sensitive system than the phase modulated system, for the same received signal level conditions. This high sensitivity, high dynamic range receiving system which utilizes a plurality of smaller antennas in lieu of a large antenna, has a carrier sensitivity better than, and a demodulated signal-to-noise ratio equal to, the larger antenna and single receiver having an equal effective area. The receiver uses a phase stable fixed frequency local oscillator signal for the first heterodyne mixer so that all branches of the receiver including the main receiver and branch receivers 1 through N have first IF signal outputs that are at the same fixed frequency, except for the frequency diversity embodiment to be described later. These signals are at a low level and are amplified in a first IF amplifier in the main receiver and N branch receivers, and are applied to a heterodyne mixer in the main receiver which receives a local oscillator signal controlled by a first phase locked loop. This phase locked local oscillator signal is distributed to the N branch receivers and applied to the second heterodyne mixer of each receiver. The main receiver and the branch receivers include a third heterodyne mixer and a third IF amplifier. The local oscillator signal applied to the third heterodyne mixer in each branch receiver is controlled by a phase locked loop in each branch receiver. The local oscillator applied to the third heterodyne mixer in the main receiver is a fixed phase stable frequency.

The outputs of the main receiver and the N branch receivers at the third IF amplifier output are fed to a carrier summing junction where the carrier signals are combined in phase to yield a carrier sensitivity greater than a single receiver and large aperture antenna with equal effective area.

A separate wide bandwidth third IF amplifier and phase detector in the main receiver and each branch receiver provide coherent demodulation of the signal.

All receiver signals are coherently summed in a separate summing junction to provide the data spectrum output to the user. The modulation group delay of each branch receiver is matched to the corresponding main receiver group delay to optimize the signal-to-noise ratio of the correlated modulation output signal.

A digital implementation of the receiver allows the carrier phase locked loop bandwidth of the summed receiver system to be automatically adjusted in accordance with the carrier predetection signal-to-noise ratio such that the receiver can accommodate the signal-to-noise ratio degradation due, for example, to atmospheric effects.

In operation, the receiver is tuned to the carrier frequency of the satellite service by setting the frequency of the first local oscillator signal at the first heterodyne mixer. The first local oscillator frequency is set to receive any one of the several transmissions provided by the satellite service by selecting the matching phase stable fixed frequency source. This first local oscillator signal is set either manually or by remote control and provides the first IF output signal when heterodyned with the tuning reference frequency. Fixed frequency phase stable references are mixed with a phase locked loop signal to provide the local oscillator signal controlled by a carrier first phase locked loop, to the second heterodyne mixer in the main receiver and to the second heterodyne mixers in the N branch receiver channels (except for frequency diversity reception). This heterodyne process provides the second IF output signal in the main and N branch receivers. After heterodyne conversion in the third heterodyne mixer with a fixed frequency phase stable reference in the main receiver, the carrier third IF is summed with the N branch receiver carrier third IFs to provide coherently summed carriers plus carrier loop predetection receiver noise of the main receiver and the N branch receivers. The bandpass limited output of the summed main receiver carrier third IF amplifier is analog-to-digital (A/D) converted and compared in phase with the quadrature phase of the coherent A/D converted detector reference frequency, sampled every $T_1$ time interval and averaged over each $T_1$ to provide a measure of the phase error (in digital form) in the phase locked loop for each $T_1$. The time between samples $T_1$ is a function of the received signal level. This averaged measure of phase error for each $T_1$ in digital form is applied to a software tracking filter whose output causes a numerically controlled oscillator to change phase, and when mixed with the main receiver fixed reference frequencies, provides phase lock with the received carrier frequency. Analog techniques can also be used to accomplish the same functions.

For frequency diversity reception, a different phase stable fixed frequency oscillator, or frequency synthesizer it frequency agility is required, would be used for each N branch receiver in place of the second fixed frequency reference used in the main receiver to provide a second local oscillator frequency offset in each of the N branch receivers' second local oscillator to match the frequency offset relative to the main receiver of each of the diverse received frequencies. See FIG. 4 for a block diagram of the receiver.

The patent literature on arraying receivers, notably patent No. U.S. Pat. No. 4,186,347 shows second IF predetection filters that are equivalent to the third IF carrier predetection filters in the instant invention and states that the noise bandwidths of the branch receiver IF carrier predetection filter and the main receiver IF predetection filter are equal. However, it was more recently proven that for operation near threshold sensitivity, actively introducing additional amplified, uncorrelated, IF predetection noise improves immunity to cycle slipping and loss of carrier lock in the summed receiver since this adjusts the carrier phase locked loop bandwidth to a narrower value which results in a significant increase in the signal-to-noise ratio and a resultant reduction in phase noise in the main receiver carrier tracking loop. Reduction in carrier loop rms phase noise reduces the probability that the phase noise peaks will exceed 90 degrees and produce cycle slipping with resultant loss in carrier phase lock. In the instant invention it is required that additional amplified uncorrelated predetection receiver noise from the branch receivers be summed with the coherently summed carriers in the main receiver. The additional amplified IF predetection noise represents noise outside the IF carrier predetection filter bandwidth. This embodiment of the invention is described with reference to FIG. 2.

The architecture of the summed receiver system, using a plurality of channels, lends itself well to encryption of program material by frequency diversity either singly or in combination with other scrambling or encoding techniques. In frequency diversity, a television transmission or other data, particularly imaging data, are split up among the several receivers, each operating at a separate frequency making up the summed system and are reassembled by keyed decoding functions with the key being changeable and known only to the subscribers. Since the carrier signals are coherently summed and demodulated, they can each carry discrete segments of the modulation. This can permit simultaneous transmission of at least two separate messages since one or more additional messages can be included during those intervals when the several receivers are not carrying discrete segments of the initial message. The frequency diversity encryption method is adaptable to the widely used aerospace, generally post-detection, encoding methods that are fully developed. These include pseudonoise coding and interleaved Reed-Solomon coding, as well as the simpler multiplexing algorithms. The proper encoding algorithm can produce improved data since error correction, data compression and dropout compensation can be employed.

Another aspect of the receiver system of this invention is its adaptability to frequency reuse; i.e., transmitting and receiving separate information on orthogonal polarizations of the same signal. As an illustration, in this implementation, the six channels of the receiver are split up into three antennas each with orthogonal polarization output ports. In this manner, six different carriers can be used for frequency diversity with each antenna having a polarization diversity capability, enabling further possibilities for secure communications. The novel receiver is uniquely adaptable to all the modes of satellite transmission that are in use or planned for the near future.

BRIEF DESCRIPTION OF THE FIGURES

The novel features of the invention are set forth in the drawings of which.

DESCRIPTION OF THE PREFERRED EMBODIMENTS

The receiver embodiments to be described in the following have in common the use of equal or unequal aperture antennas, each having a separate receiver channel with the channels being summed after the third IF amplifiers in each of N receiver channels. The signal carriers are summed in this system in such a manner that the signals are coherently additive while the noise is summed in an rms fashion. The point of summing is after the predetection IF amplifiers for the carriers while the modulation spectrums are summed in another junction at baseband. In the embodiments to be described, only one branch receiver A of N possible branches is shown because the branch receivers are identical except for possible differences in group delays, and differences in configuration for frequency and polarization diversity implementations.

Figure 1:
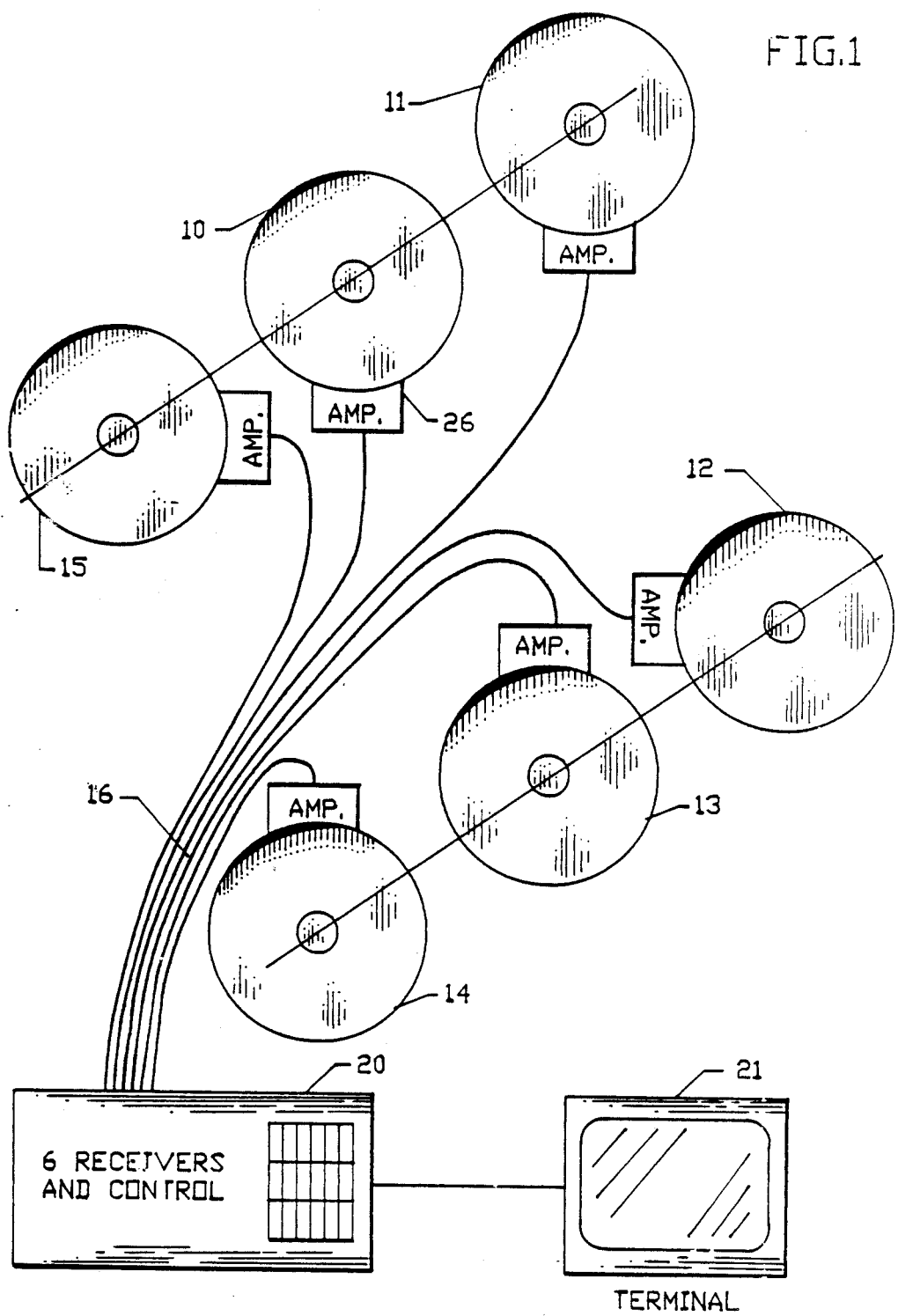
FIG. 1 is a conceptual drawing of the receiver installation illustrating the equal or unequal aperture antennas and the remotely located elements of the novel receiving system as well as the operator and display elements.

Referring now to FIG. 1, the antenna paraboloids for the receiver include the main receiver antenna and branch receiver antennas 11 through 15. The distance between the main antenna and the branch antennas is dependent upon the antenna enclosure, or if the space is unlimited for antenna installation, the branch antennas can be located for spatial diversity to compensate for fading due to atmospheric propagation effects. The paraboloids are nominally a few feet in diameter providing convenient light weight packages that can be easily handled by one man for installation in the upper story of a residence or office building where they can be concealed and protected from the environment. Low voltage DC is provided for powering the wideband amplifiers at the base of the antenna. Coaxial lines 16 connect the antennas' amplifiers to the summing receiver at a location that could be hundreds of feet away. Delay line loops in the coaxial cables provide for tailoring the group delays in the branch antennas relative to the main receiver as a rough approximation. Phase shifters in the receiver channels perform the vernier group delay adjustments. Once set, the group delays in each receiver channel remain the same. The receiver package in this embodiment is a five branch channel and one main channel receiver having fixed frequency selection for tuning control. Depending on the service being rendered by the satellite service; for example, television or facsimilie, an appropriate display device or terminal and peripheral device 21 is operated from the six channel receiver.

Figure 2:
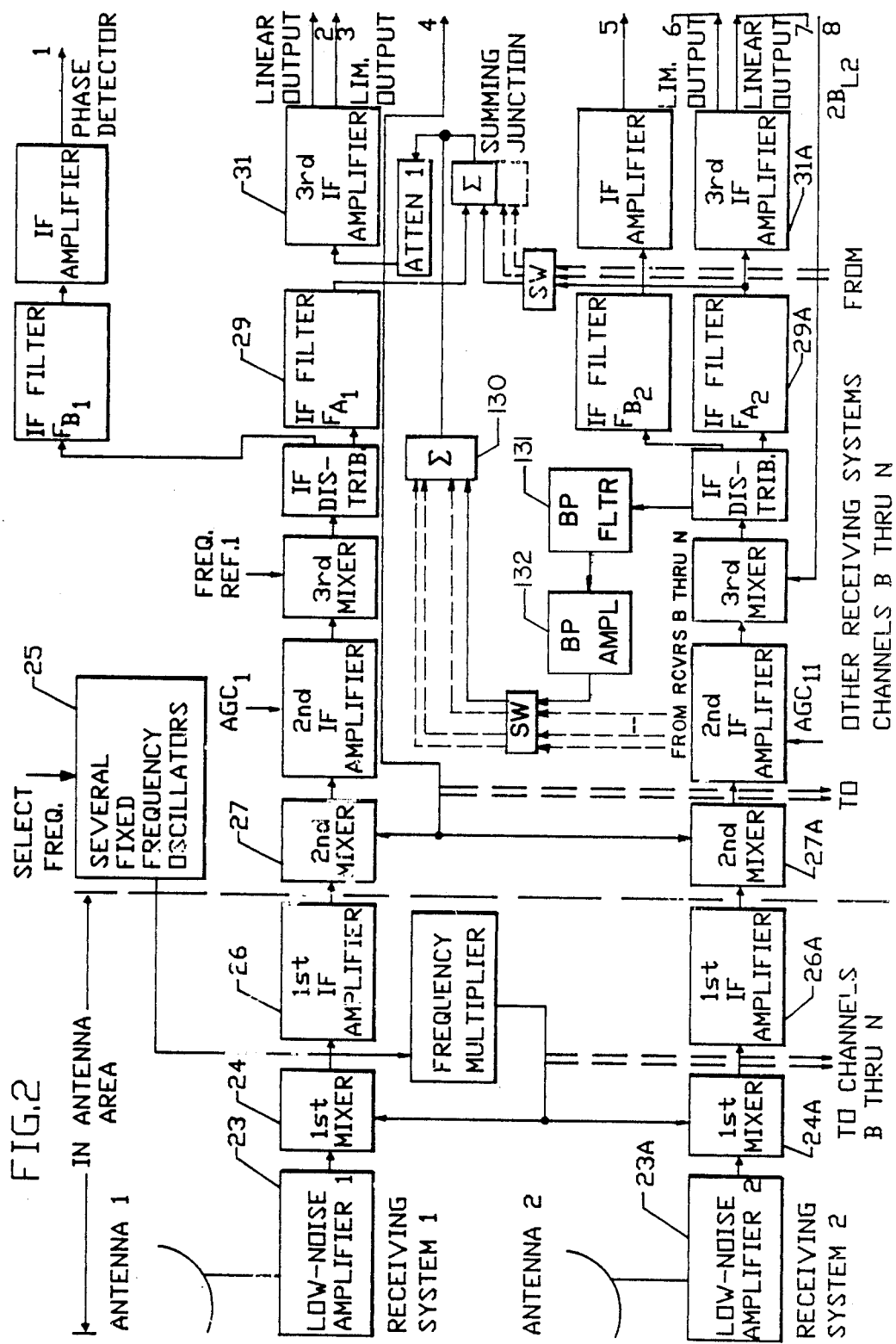
FIG. 2 is a schematic block diagram of the receiver showing the essential elements of the receiver including the front end, the receiver channels, the summing methods for the carrier and the modulation spectrums when taken in combination with FIG. 3 which shows the digital controller.

FIG. 2 shows the conceptual block diagram of the main channel and one branch channel. All the branch channels are essentially the same as the A channel. The wideband amplifiers at the antennas 23 provide sufficient bandwidth to accommodate the desired reception band. These amplifiers are designed to be low noise within the state of the art. Any signal in the frequency range is applied as one input to the first heterodyne mixer 24. The other input to the mixers 24 is the first local oscillator signal which is a source 25 of fixed frequency phase stable signals, manually or remotely settable for receiver tuning. The output of the first mixers 24 are applied to first IF amplifiers 26. These amplifiers furnish the first intermediate frequency outputs from the antenna area for each receiver channel. These signals are applied to second mixers 27 in the receiver package located remotely from the antenna area for each receiver channel. The second heterodyne mixers 27, 27A through N have a local oscillator which coherently tracks the phase of the received carrier at the first IF frequency with a carrier tracking loop in the main receiver. This tracking loop includes the third IF filters 29, the carrier summing junction 30 which is summed with additional amplified IF predetection receiver noise from branch receiver A (through N) and the third IF amplifier 31 in the main receiver. The additional amplified IF predetection noise provided by bandpass filter 131 whose passband is offset from filter $F_{A2}$ passband (and does not include any portion of filter $F_{A2}$,s pass band) and amplified by bandpass (BP) amplifier 132, input to summing junction 130 to provide the performance described and presented in the instant invention.

In summary, the additional amplified IF predetection noise is uncorrelated with the predetection noise in the passband of filter $F_{A2}$ and its level is set by the combination of bandpass amplifier 132 operating in conjunction with bandpass filter 131. The bandpass center frequency and bandwidth of filter 131 is chosen so that it does not include any received modulation signals which thereby eliminates performance degradation in RF carrier loop phase tracking and RF carrier demodulation efficiency due to this possible source of error. The gain of bandpass amplifier 132 is then set to achieve the carrier sensitivity improvement that can be obtained above that provided by the ratio of the effective antenna array aperture size to the main receiver effective antenna aperture size. Prior art does not insure elimination of the unacceptable performance deterioration due to inclusion of modulation spectra in the predetection noise, described above. The instant invention does eliminate this possible source of error and performance degradation. The embodiment shown in the instant invention illustrates the total carrier sensitivity improvement that can be realized by a particular selection of bandpass amplifier 132 gain and bandpass filter 131 bandwidth that provides noise power to the summing junction that is 9 dB greater than the noise power provided by branch receiver filter $F_{A2}$. Injection of this additional uncorrelated receiver noise in the summing process does not perceptibly reduce or change the signal RF carrier-to-noise spectral density ratio in the RF carrier phase tracking closed-loop noise bandwidth. This injection of additional uncorrelated noise does reduce the received RF carrier component in the third IF amplifier-limited output in the main receiver which in turn decreases the closed loop noise bandwidth of the main receiver carrier phase tracking loop at a given signal level near threshold sensitivity. This reduction in closed loop noise bandwidth results in a significant increase in signal-to-noise ratio and resultant reduction in phase noise in the main receiver RF carrier tracking loop. Reduction in RF carrier loop rms phase noise error permits operation at lower signal levels and consequently provides carrier sensitivity improvement in the instant invention that is significantly greater than the ratio of effective antenna array aperture size to main receiver effective antenna aperture size.

Figure 3:
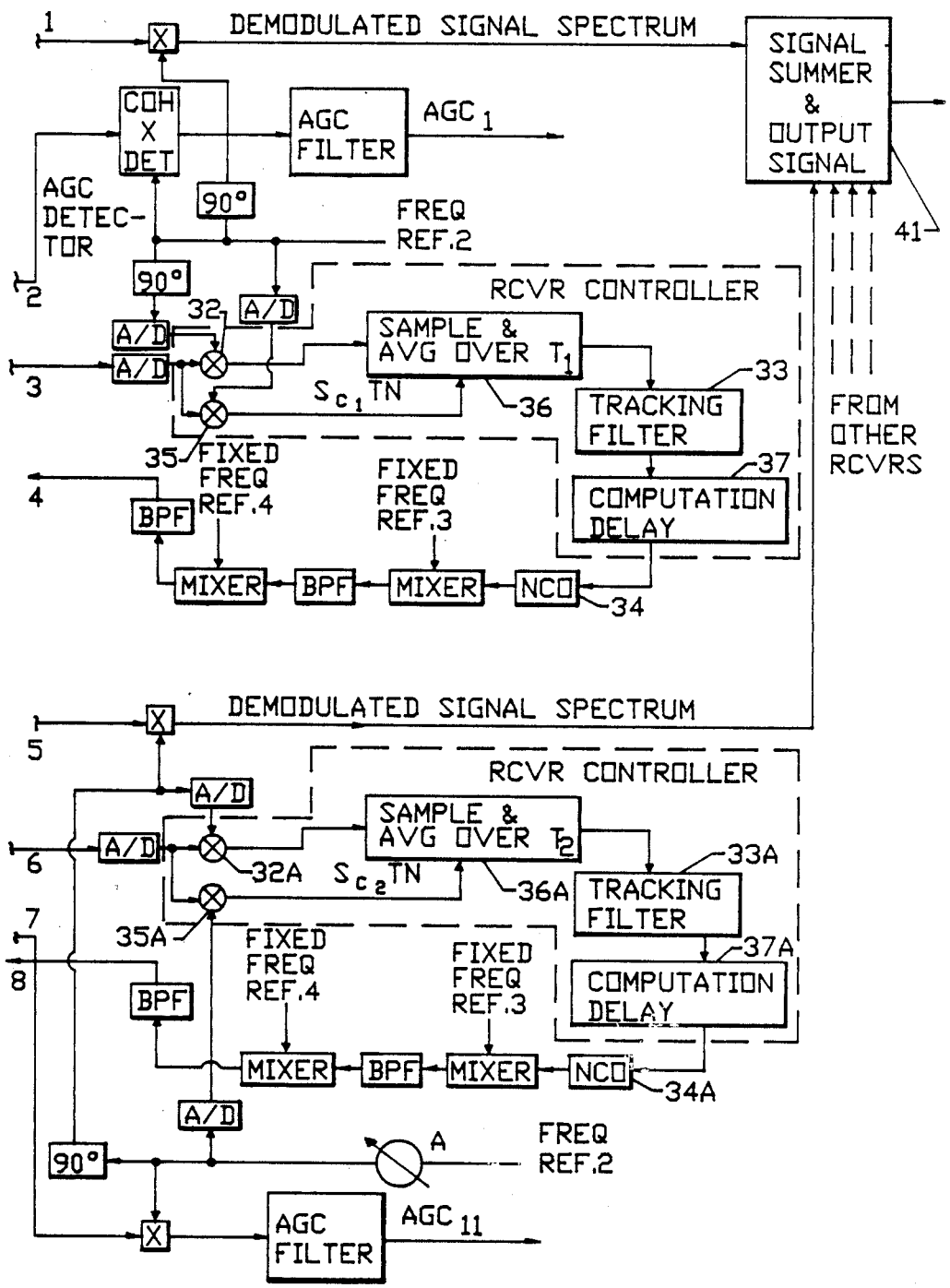
FIG. 3 is a block diagram of the digital controller which applies to both FIGS. 2 and 4 for controlling the bandwidth of the phase locked loop local oscillator.

Referring to the main receiver third IF amplifier 31, this amplifier has a limited output and a linear output. The linear output is applied to a coherent amplitude detector and AGC circuits which operate in a conventional manner. The limited output provides a carrier component which varies with received carrier level which in turn, provides change in closed loop tracking bandwidth with change in signal level as described herein. The reference signals shown are all standards for frequency and are phase stable within the state of the art for high quality equipment. Refer to FIG. 3

The bandpass limited output of the summed main receiver third IF amplifier 31 is analog-to-digital (A/D) converted and compared in phase with the quadrature phase of the coherent A/D converted second reference frequency in detector 32, sampled every time interval $T_1$ and averaged over each $T_1$ time interval to provide a measure of the phase error in digital form in the phase locked loop for each $T_1$. The time between samples $T_1$ is a function of the receiver signal level. This average measure of phase error for each $T_1$ time interval is applied to a software or firmware tracking filter whose output causes a numerically controlled oscillator (NCO) 34 to change phase. When mixed with the main receiver fixed reference frequencies, the NCO with D/A provides phase lock with the received carrier frequency. The bandpass limited carrier third IF output; i.e., summed coherent carrier plus receiver noise, is constant in level, with the receiver predetection noise component decreasing and the carrier component increasing as the received satellite signal level increases. The time interval between samples 71 is controlled by the carrier component $S_{c1}$ of the bandpass limited third IF output with the time between samples $T_1$ decreasing as $S_{c1}$ increases. The carrier component $S_{c1}$ is represented by the average value of $S_{c1}+$ noise, a digital value, which results from digital detection of the A/D converted bandpass limited output of the main receiver carrier third IF amplifier, with the in-phase A/D converted detection second reference frequency for the main receiver phase locked loop. At the design point, the average value of $S_{c1}+N$, a digital value, provides a specified value $T_1$ which in conjunction with other loop parameters, determines the design point closed loop bandwidth of the main receiver carrier phase locked loop. As the receiver input signal level increases, the average value of $S_{c1}+N$ increases. This reduces $T_1$ or time between samples which in turn increases the closed loop noise bandwidth of the main receiver carrier phase locked loop. The N branch receivers utilize similar techniques to provide in each branch receiver a local oscillator controlled by a carrier phase locked loop to the third heterodyne mixer with fixed frequency phase stable references and set to the same frequency as reference frequency 1 in the main receiver to achieve phase lock and track out any differential phase effects. The $S_{c1}+N$ is provided by detecting the limited output of the third IF amplifier with the reference frequency, in detector 35. The average value is applied to the sample and average 36 which controls the value $T_1$ which is inversely proportional to the carrier component $S_{c1}$. A similar situation exists in the branch receiver A where the $S_{c2}+N$, carrier signal plus noise, is applied to the sample and average 36A such that the sampling period $T_2$ is inversely proportional to the carrier component $S_{c2}$. The computation delay 37 provides a delay and controls the time for each $T_1$ when the phase of the NCO in the main receiver is changed. Another unique element of the receiver is the demodulator signal spectrum summing which occurs after the third mixer, emanating from the second IF distribution amplifier and IF filter, followed by a third IF amplifier and phase detector, the output of which is the demodulated signal spectrum. These outputs from the main receiver and the N branch receivers are coherently summed in a signal summer 41. This summing circuit provides a demodulated signal at a carrier margin enhanced over what would be available relative to the signal to noise ratio of a single antenna and receiver system having the same aperture area.

Figure 4:
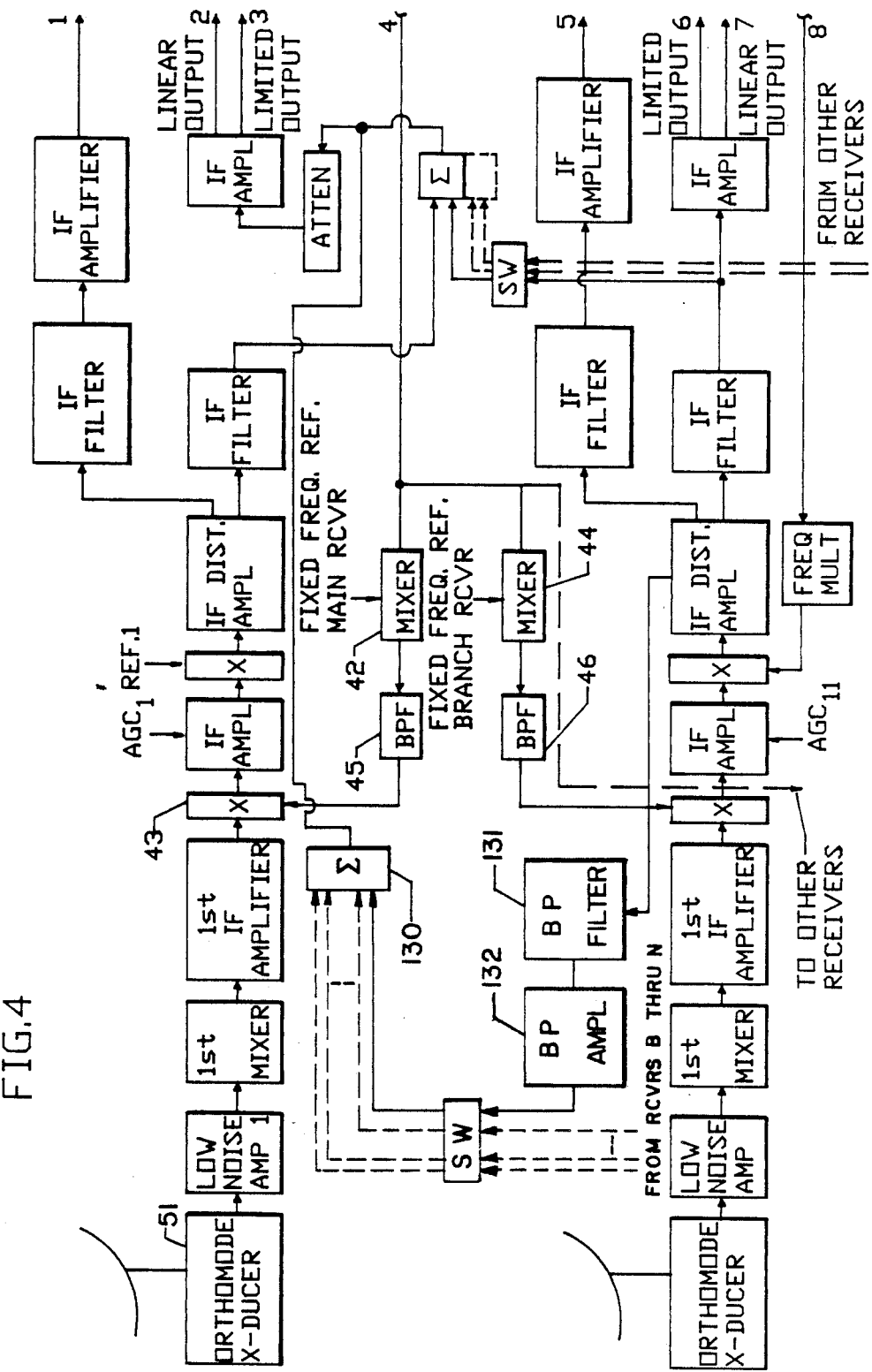
FIG. 4 is a schematic block diagram of the frequency diversity embodiment of the receiver, illustrating also the polarization diversity and frequency reuse capabilities of the receiver.

Reference is directed to FIG. 4 which shows an embodiment of the invention for frequency diversity, frequency reuse for bandwidth conservation by transmitting information on orthogonal components of the same frequency carrier, and a polarization diversity mode of operation. It can be seen from FIG. 4 that the architecture of the receiver is substantially the same as the receiver of FIG. 2 except that in the main receiver the phase locked receiver controller output is applied to a first mixer 42 which receives a fixed frequency reference that is of a high frequency so that the sum of the two inputs to the mIxer 42 is equal to the local oscillator frequency desired to tune the second mixer 43 to heterodyne with the output signal from the first IF output amplifier emanating from the antenna area to produce the second IF signal which is coherently detected as described for FIG. 2. The difference between FIG. 2 and FIG. 4 is in the branch receivers A through N. Each receiver operates at a different frequency, yet they remain coherent with the main receiver system by virtue of the fact that the main receiver controller phase locked loop output is applied to a mixer 44 which also receives a phase stable mixed frequency reference so that the output of the mixer 44 is a frequency offset from the main receiver frequency and differing from the input signal from the first IF amplifier of the branch receiver, emanating from the antenna area, by the second IF frequency. The bandpass filters 45 and 46 establish the bandwidth limit and select the proper frequency output of the mixers 42 and 44. It will be appreciated that this implementation allows each branch receiver to operate at a different frequency while maintaining phase coherence with the main carrier signal and enables summing of the third IFs which are at the same frequency to provide the advantages previously described for the summed receiver configuration. The demodulated signal spectrum from each receiver is applied to a modulation summing circuit as in the embodiment of FIGS. 2 and 3. It is apparent that since the modulation spectrums can be summed, different segments of the modulation can be transmitted on separate carriers received by separate receivers. These separate carriers can further be encoded with the same or separate codes and decoded after the summing circuit 41, FIG. 3. Thus, a two dimensional encoding or scrambling system is provided for secure communications.

Another embodiment of the versatile receiver adapts it to bandwidth conserving frequency reuse modes of transmission. With reference to FIG. 4, with FIG. 3, each antenna can employ an orthomode feed 51 such that the main receiver channel can receive the signal from one of the orthogonal polarization ports while a branch receiver can receive orthogonal polarization signals from the other.

Also, in this embodiment, two of the branch receivers can receive the signals from orthogonal polarization ports of the second antenna. This technique can be expanded to a third antenna with orthogonal polarization ports and two additional branch receivers. This configuration is also advantageous for secure communications wherein segments of the data spectrum can be multiplexed on orthogonal polarizations of the carrier according to an algorithm. The combination of frequency diversity as described earlier and polarization diversity is possible wherein a carrier frequency of left circular polarization and another carrier offset therefrom can have right circular polarization, both carriers containing modulation or encoding segments thereof, can be combined in the receiver of FIG. 4 and FIG. 3, thereby providing two additional dimensions for encoding or encryption algorithms.

Figure 5:
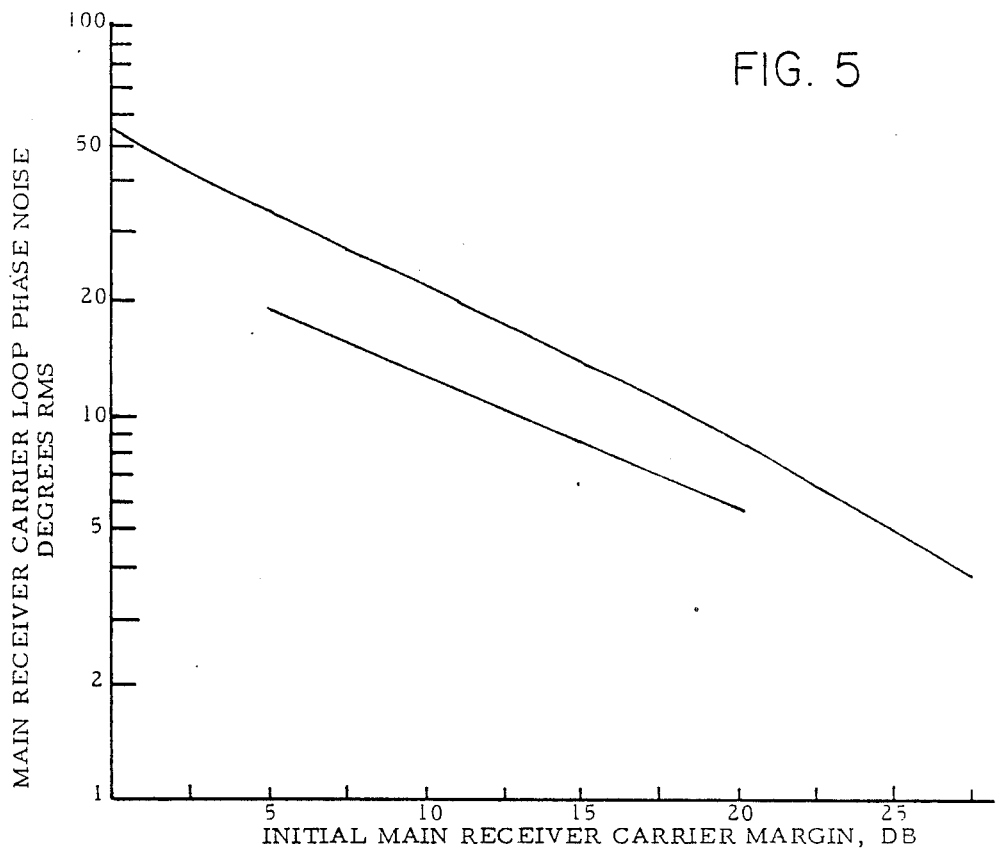
FIG. 5 is a graph showing the effect on the carrier margin of summing additional amplified uncorrelated IF predetection noise from the branch receiver third IF with the summed carriers in the main receiver for equal apertures, in preventing loss of phase lock at very low signal levels.

Referring to FIG. 5, we see a plot of phase noise in degrees rms in the carrier phase tracking loop versus initial main receiver carrier margin. We note that for the main receiver alone at low carrier margins of 0 to 10 dB, the phase noise is greater than 22 degrees and cycle slipping in the carrier tracking loop will occur. The plot shows that with the main receiver and one branch receiver with equal aperture antennas coherently summed and then summed with additional branch receiver amplified uncorrelated IF predetection noise, the gain in carrier margin is 6.6 dB at low carrier levels and cycle slipping for the coherently summed receivers will not occur at a carrier level which represents an initial 4 dB carrier margin for the main receiver alone. This represents a basic difference of the invention over the prior art in which this principle; i.e., additional amplified uncorrelated IF predetection branch receiver noise summing was not recognized or utilized.

Figure 6:
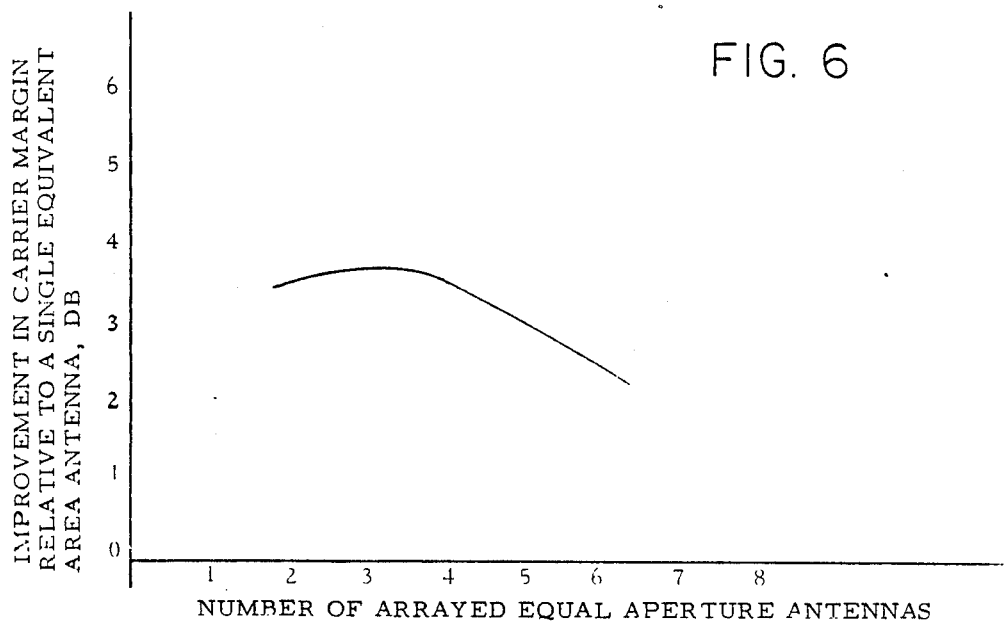
FIG. 6 is a graph showing the effect of increasing the carrier margin by combining the outputs of a plurality of equal aperture antennas and their receiver channels.

Reference to FIG. 6 shows another graph of carrier margin improvement over a single equivalent area antenna for an array of from 2 to 6 antennas with additional branch receiver amplified uncorrelated IF predetection noise summed with the coherently summed carrier. Consider the case shown and described in FIG. 5 for a main receiver and one branch receiver with equal aperture antennas. A single equivalent antenna with its receiver would have twice the area which provides 3 dB more carrier margin than the main receiver with its smaller antenna. However, as shown in FIG. 5, the equal aperture array has 6.6 dB more carrier margin than the main receiver alone with its antenna. Consequently, the improvement or "enhancement" in carrier margin for two equal aperture antennas with their receivers is 6.6 minus 3 or 3.6 dB relative to a single equivalent area antenna with its receiver as shown in FIG. 6. This relative carrier margin improvement increases slightly for a main receiver and two branch receivers (3 antennas) arrayed and decreases to 2.6 dB improvement for 6 antennas with their receivers arrayed.

Figure 7:
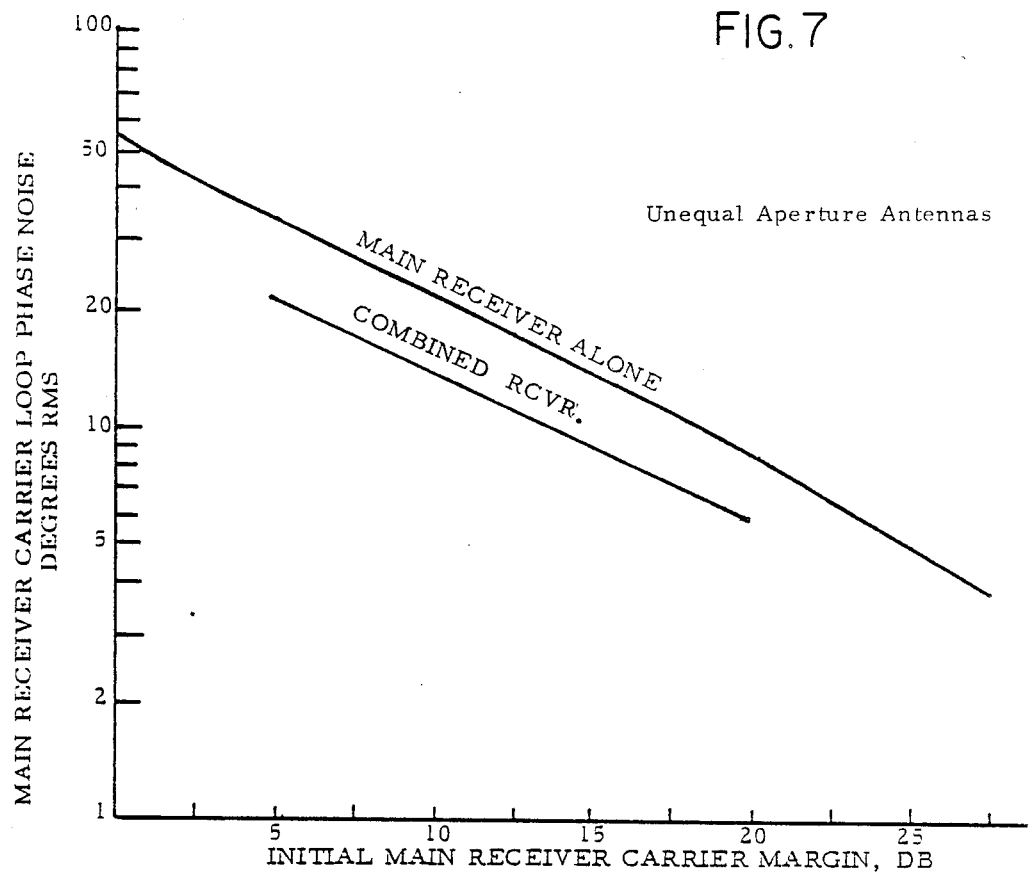
FIG. 7 is a graph showing the effect on the carrier margin of summing additional amplified uncorrelated IF predetection noise from the branch receiver third IF with the summed carrier in the main receiver for unequal apertures, in preventing loss of phase lock at very low signal levels.

Referring to FIG. 7 as an example, we see a plot of phase noise in degrees rms in the carrier phase tracking loop versus initial main receiver carrier margin, for the case where the branch receiver antenna diameters are 0.6 the diameter of the main receiver antenna, and the aperture efficiencies and receiver noise temperatures are equal. We note that the main receiver alone, at low carrier margins of 0 to 10 db, has a phase noise greater than 22 degrees and cycle slipping will occur in the carrier tracking loop. The plot shows that with the main receiver and one branch receiver coherently summed, and then summed with additional amplified, uncorrelated IF predetection noise, the gain in carrier margin is 4.64 db at low carrier levels, and cycle slipping for coherently summed receivers will not occur at a carrier level which represents an initial 5.5 db carrier margin for the main receiver alone. This represents a basic improvement over the prior art in which this principle was not recognized and not utilized.

Figure 8:
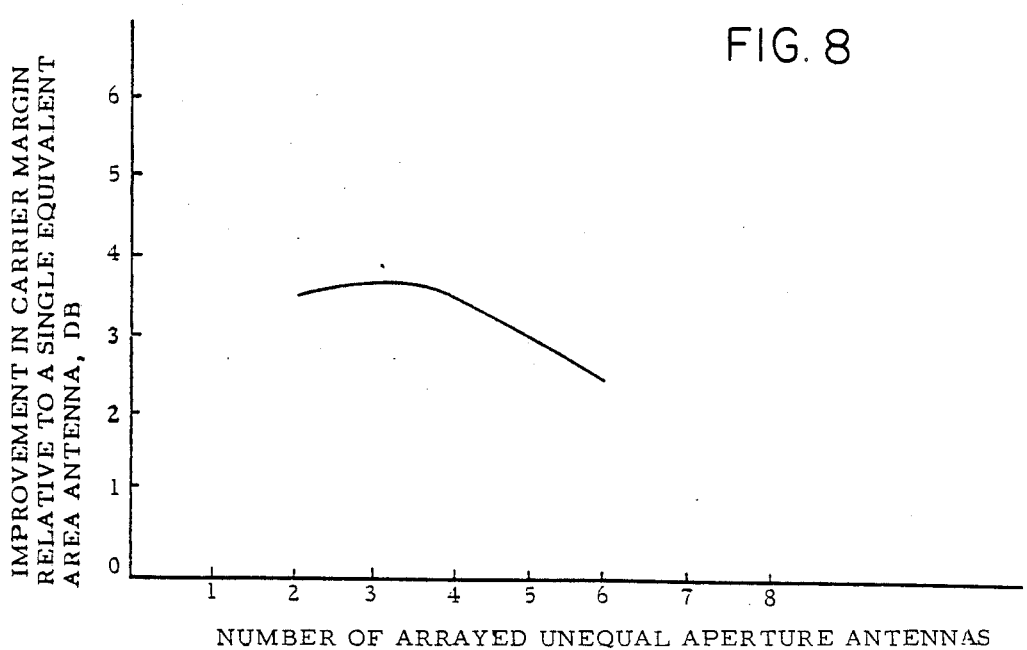
FIG. 8 is a graph showing the effect of increasing the carrier margin by combining the outputs of a plurality of unequal aperture antennas and their receiver channels.

Reference to FIG. 8 shows another graph of carrier margin improvement over a single equivalent area antenna for an array of from 2 to 6 antennas with additional branch receiver amplified uncorrelated IF predetection noise summed with the coherently summed carrier. Consider the case shown and described in FIG. 7 for a main receiver and one branch receiver with an antenna aperture of 0.36 the main receiver antenna. A single equivalent antenna with its receiver would have 1.36 times the area which provides 1.34 db more carrier margin than the main receiver would have with its smaller antenna. However, as shown in FIG. 7, the two-antenna array has 4.64 db more carrier margin than the main receiver alone with its antenna. Consequently, the improvement or "enhancement" in carrier margin for the two antenna array is 4.64 minus 1.34 or 3.3 relative to a single equivalent area antenna with its receiver as shown in FIG. 8. This relative carrier margin improvement increases slightly for a main receiver and two branch receivers (3 antennas) arrayed and decreases to 2.4 db improvement for 6 antennas and arrayed receivers.

Although the novel receiver embodiments show paraboloidal antennas, other types can be used; e.g., disk-on-rod, offset, shaped reflector, without departing from the teachings of the invention.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. In an array of phase coherent receiving systems for receiving a communications satellite amplitude modulated carrier signal of variable level, and having a residual phase stable carrier level a few percent of total signal power, including a main receiver channel and at least one branch receiver channel connected to separate antennas, wherein the array maximum carrier sensitivity is determined by the total effective antenna aperture size, said receiver channels each including a mixer followed by a channel filter, a predetection IF amplifier and a detector, said main receiver channel including an intermediate frequency amplifier having a wide band modulation output and a narrow band limited carrier output, a carrier phase locked loop local oscillator coupled to the narrow band limited carrier output of the main receiver channel distributing a local oscillator signal from the main receiver to each branch receiver at the mixers thereof, the phase coherent IF signals of the branch receivers being summed with the main receiver IF signal and applied to said main receiver carrier phase locked loop IF amplifier and limiter, the improvement which comprises:

controller means for varying the bandwidth of said main receiver carrier phase locked loop in proportion to received signal level, connected between said main receiver narrow band limited carrier output and said mixer; and means for summing uncorrelated predetection receiver noise from at least one branch receiver, outside the bandpass of said branch receiver channel filter, with the summed phase coherent outputs of the main and branch receivers, said summing means having an output connected to said intermediate frequency amplifier and limiter of said carrier phase locked loop for dynamically varying the bandwidth of said carrier phase locked loop;

whereby the array sensitivity exceeds that due to the total antenna aperture size and the array sensitivity adjusts to said modulated carrier signal level at very low signal levels.

2. A receiver as defined in claim 1 wherein each branch receiver employs a phase locked loop bandwidth controller in a second phase locked loop preceding the third intermediate frequency amplifier, whereby the bandwidth of the phase locked loop in each branch receiver channel is varied in accordance with signal level.

3. A downlink receiver as described in claim 1 wherein said controller means is a bandpass limiter amplifier having a constant power output with varying input signal-to-noise power ratio.

4. A downlink receiver as described in claim 1 wherein said controller means is a total power Automatic Gain Control system producing constant power output with variation in input signal-to-noise power ratio.

5. A downlink receiver as described in claim 1 wherein said controller means comprises means for increasing the open loop gain of the RF carrier phase tracking loop within the region of stable loop operation as the signal component in the limited IF output increases.

6. In an array of heterodyne receiving systems including antennas for receiving a communications satellite modulated carrier signal of variable level, and having a residual phase stable carrier level a few percent of total signal power said array having a main receiver and at least one branch receiver, including an IF amplifier having an input and an output, the main receiver having a carrier phase locked loop local oscillator signal distributed to all receivers, producing phase coherent intermediate frequency outputs therefrom, and summing means for combining the outputs to enhance the carrier sensitivity margin, and modulation summing means for combining the demodulated outputs to enhance the modulation signal-to-noise ratio, the improvement, which comprises:

a noise adder having an input and an output, for setting bandwidth and level of summed additional amplified uncorrelated predetection receiver noise of said at least one branch receiver, connected to said IF amplifier input of said main receiver at said noise adder output, and connected to said at least one branch receiver IF amplifier output at said noise adder input.

7. The improvement in an array of antennas and heterodyne receiving systems as described in claim 6 wherein said noise adder further comprises a bandpass filter in series with a bandpass amplifier and a summing junction for combining said predetection receiver noise of a plurality of branch receivers for injection into the main receiver.

8. A receiver for satellite communications, which comprises:

a plurality of antennas receiving at least one modulated signal having a carrier frequency;

a plurality of heterodyne receiver channels including a main receiver channel and at least one branch receiver channel, each connected to one of said plurality of antennas, and each including a mixer, and an IF amplifier having a limited output and a wideband output, for amplifying and converting said modulated carrier signals to a narrow band IF carrier output, and a wideband IF modulation spectrum output, said outputs being phase coherent with said received carrier frequency;

a carrier phase locked loop local oscillator coupled to said main receiver channel and to said branch receiver channels at the mixers thereof, for maintaining carrier phase coherence of the main receiver channel and the branch receiver channels;

a first summing means for combining said narrow band output of each of said plurality of heterodyne receiver channels into a single narrow band carrier and noise spectrum, said narrow band output coupled to said phase locked loop local oscillator;

a second summing means for combining said wideband IF detector outputs of said plurality of receiver channels, said second summing means having an output;

a third summing means for combining additional amplified predetection receiver noise of the branch receivers, for injection into the main receiver at the output of said second summing means, coupled to said main receiver from each of said branch receivers;

detector means connected to said wideband IF output of said plurality of receiving channels for demodulating the modulation spectrum including at least one information signal, for communicating the information to users;

whereby the carrier sensitivity margin and the signal-to-noise ratio of the modulation spectrum are both enhanced in accordance with the number of branch receiver channels and the immunity to cycle slipping at low carrier sensitivity margins is enhanced in accordance with additional amplified uncorrelated predetection receiver noise of the branch receivers coupled into the main receiver modulation IF channel.

9. A receiver for satellite communications, having a radio frequency carrier sensitivity exceeding that due to total effective antenna aperture size, which comprises:

a plurality of antennas receiving at least one modulated signal having a carrier frequency;

a plurality of heterodyne receiver channels including a main receiver channel and at least one branch receiver channel, said receiver channels connected to separate antennas of said plurality of antennas, said receiver channels each including a mixer, and an intermediate frequency amplifier having a wide band modulation output and a narrow band, limited, carrier output;

a carrier phase locked loop local oscillator coupled to the narrow band limited carrier output of the main receiver channel, and distributing a local oscillator signal from the main receiver to each branch receiver at the mixers thereof;

a first summing means for combining said narrow band output of said plurality of heterodyne receiver channels into a single narrow band carrier and noise spectrum, said narrow band spectrum coupled to said phase locked loop local oscillator for maintaining phase coherence of all of said plurality of heterodyne receiver channels;

a second summing means for summing amplified uncorrelated predetection receiver noise of the branch receivers, outside the bandpass filter bandwidth of the branch receivers, coupled to the main receiver channel narrow band limited carrier IF amplifier;

detector means demodulating said wideband intermediate frequency output from each receiver channel, said detector means having an output;

a third summing means for combining said wideband demodulated intermediate frequency output of said detector means in said plurality of receiver channels, said third summing means having an output, for distribution to information services.

10. A receiver as described in claim 9 further comprising:

an orthomode transducer receiving left or right circular polarization in said main receiver channel and its opposite in said at least one branch receiver channel whereby said branch receiver channel receives a modulation different from the main receiver on an orthogonal polarization of the same carrier frequency without loss of carrier sensitivity margin.

11. A receiver as described in claim 9 further including a phase stable frequency generator connected to each branch receiver through a mixer and a bandpass filter to said main receiver phase locked loop local oscillator wherein each branch receiver receives a different carrier frequency, and a different local oscillator frequency offset from the phase locked loop local oscillator of the main receiver by a mixer receiving the output from said offset phase stable frequency generator, and the local oscillator of the main receiver, producing an intermediate frequency that is the same in all receiver channels.

12. A receiver as described in claim 9 wherein said plurality of antennas consists of disk-on-rod antennas.

13. A receiver as described in claim 9 wherein said plurality of antennas consists of paraboloid reflector antennas of the focal point type.

14. A receiver as described in claim 9 wherein said plurality of antennas consists of offset paraboloid antennas, including shaped reflector antennas.

15. A receiver as described in claim 9 wherein said plurality of antennas consists of reflector antennas of the cassegrainian type.

16. A receiver for satellite communications as described in claim 9 wherein said detector means comprises an analog phase detector, an analog tracking filter and a voltage controlled crystal controlled oscillator driving a frequency multiplier to provide the local oscillator and provide a carrier phase tracking loop.

17. A frequency diversity receiver for secure communications satellite, transmissions of modulated carrier signals derived from a phase stable carrier having a residual level that is a few percent of total signal power, wherein a transmission is segmented and scrambled for secrecy on the carriers and is unscrambled by those permitted access, which comprises:
- a plurality of antennas simultaneously receiving a plurality of modulated carrier signals, each carrier having a different frequency and modulation segments modulated thereon in accordance with a scrambling algorithm;
- a plurality of heterodyne receiver channels including a main receiver channel and at least one branch receiver channel, said receiver channels connected to separate antennas of said plurality of antennas, said receiver channels each including a mixer, and an intermediate frequency amplifier having a wide band modulation output and a narrow band filter and limiter producing a limited, carrier output;
- a carrier phase locked loop local oscillator including coherent frequency offset means distributing a unique frequency, offset from the main receiver local oscillator frequency, to each branch receiver at the mixers thereof;
- a first summing junction for combining said narrow band output of said plurality of heterodyne receiver channels into a spectrum coupled to said phase locked loop local oscillator for maintaining phase coherence of all of said plurality of heterodyne receiver channels;
- a second summing means for summing amplified uncorrelated predetection receiver noise of the branch receivers, outside the bandpass filter bandwidth of the branch receivers, coupled to the main receiver channel narrow band limited carrier IF amplifier;
- detector means demodulating said wideband intermediate frequency output from each receiver channel, said detector means having an output for each receiver channel;
- a third summing junction for combining said wideband demodulated intermediate frequency outputs of said detector means in said plurality of receiver channels, said junction having an output; and
- unscrambling means connected to said third summing junction output for unscrambling said wideband demodulated intermediate frequency output of said detector means in accordance with said algorithm;
- whereby segments of the original signal modulated on the carrier signals, are received on different frequencies and reconstructed to duplicate the original signal.

18. A frequency diversity receiver as described in claim 12 in combination with polarization diversity wherein said plurality of antennas includes orthomode transducers at their outputs, with separate receiver channels receiving the left or the right circular modes;
- whereby secrecy encoded signals modulated on left and right circular polarizations of the transmitted signal, can be received, decoded, and reconstructed.

* * * * *